(12) United States Patent
Xu

(10) Patent No.: US 9,385,574 B1
(45) Date of Patent: Jul. 5, 2016

(54) HEAT TRANSFER FLUID BASED ZERO-GAS-EMISSION POWER GENERATION

(71) Applicant: Ever Source Science & Technology Development Co., Ltd., Beijing (CN)

(72) Inventor: Sheng Heng Xu, Waterloo, NE (US)

( * ) Notice: Subject to any disclaimer, the term of this patent is extended or adjusted under 35 U.S.C. 154(b) by 72 days.

(21) Appl. No.: 14/314,391

(22) Filed: Jun. 25, 2014

Related U.S. Application Data

(60) Provisional application No. 61/839,682, filed on Jun. 26, 2013, provisional application No. 61/840,799, filed on Jun. 28, 2013.

(51) Int. Cl.
| | |
|---|---|
| *B60L 11/02* | (2006.01) |
| *B61C 9/38* | (2006.01) |
| *H02K 7/18* | (2006.01) |
| *F03G 6/00* | (2006.01) |
| *F03G 7/05* | (2006.01) |
| *F24J 3/08* | (2006.01) |
| *F25B 7/00* | (2006.01) |

(52) U.S. Cl.
CPC .............. *H02K 7/1823* (2013.01); *B60L 11/02* (2013.01); *F03G 6/00* (2013.01); *F03G 7/05* (2013.01); *F24J 3/08* (2013.01)

(58) Field of Classification Search
USPC .......... 290/45; 62/79, 483, 476, 238.1, 235.1, 62/101; 60/670
See application file for complete search history.

(56) References Cited

U.S. PATENT DOCUMENTS

| | | | | |
|---|---|---|---|---|
| 2,248,178 | A * | 7/1941 | Kuenzli ................. | F25B 15/00 252/69 |
| 2,307,380 | A * | 1/1943 | Baker ..................... | F25B 25/02 62/101 |
| 2,548,699 | A * | 4/1951 | Bernat .................... | B25B 25/02 62/483 |
| 4,011,731 | A * | 3/1977 | Meckler ................ | B24F 3/1405 126/609 |
| 4,030,312 | A * | 6/1977 | Wallin ................... | F24F 5/0046 62/235.1 |
| 4,031,712 | A | 6/1977 | Costello | |
| 4,103,493 | A | 8/1978 | Schoenfelder | |
| 4,165,952 | A | 8/1979 | Bennett | |
| 4,171,619 | A * | 10/1979 | Clark .................... | F25B 27/007 62/101 |
| 4,184,338 | A | 1/1980 | Bennett | |
| 4,285,208 | A | 8/1981 | Takeshita et al. | |
| 4,285,211 | A * | 8/1981 | Clark ..................... | F25B 25/02 62/235.1 |
| 4,309,877 | A * | 1/1982 | Tawse ..................... | F02G 5/00 62/238.1 |
| 4,314,668 | A * | 2/1982 | Jansen ................... | F25B 15/02 165/62 |

(Continued)

*Primary Examiner* — Pedro J Cuevas
(74) *Attorney, Agent, or Firm* — Suiter Swantz pc llo

(57) ABSTRACT

A power generator apparatus is disclosed. The apparatus includes a heat absorber configured to absorb heat and provide the absorbed heat to a first heat transferring fluid. The first heat transferring fluid is then circulated to an evaporator. The evaporator is configured to: receive the first heat transferring fluid; facilitate heat exchange between the first heat transferring fluid and a second heat transferring fluid; and return the first heat transferring fluid to the heat absorber. The apparatus further includes a compressor configured to compress the second heat transferring fluid and use the compressed second heat transferring fluid to generate electricity. A heat recovery is used to retrieve heat and liquefy the second heat transferring fluid, and an expansion valve is used to regulate pressure of the second heat transferring fluid received from the heat recovery unit and return the second heat transferring fluid to the evaporator.

20 Claims, 2 Drawing Sheets

(56) References Cited

U.S. PATENT DOCUMENTS

| | | | |
|---|---|---|---|
| 4,377,398 A | 3/1983 | Bennett | |
| 4,380,909 A * | 4/1983 | Sung | F02G 5/00 62/101 |
| 4,388,812 A * | 6/1983 | Clark | F25B 25/02 62/141 |
| 4,424,681 A | 1/1984 | Rice et al. | |
| 4,693,089 A * | 9/1987 | Bourne | F24D 3/08 62/238.6 |
| 4,724,679 A * | 2/1988 | Radermacher | F25B 25/02 62/101 |
| 4,735,061 A * | 4/1988 | Hsieh | F02G 5/04 237/2 B |
| 4,918,937 A * | 4/1990 | Fineblum | F25B 1/00 62/175 |
| 4,936,109 A * | 6/1990 | Longardner | F25B 27/00 62/238.3 |
| 4,949,547 A | 8/1990 | Shimizu | |
| 5,249,436 A * | 10/1993 | Hemsath | F25B 15/04 62/101 |
| 5,271,235 A * | 12/1993 | Phillips | F25B 15/02 62/101 |
| 5,333,677 A * | 8/1994 | Molivadas | F03G 6/003 123/41.21 |
| 5,367,884 A * | 11/1994 | Phillips | F25B 15/02 62/101 |
| 5,383,342 A | 1/1995 | El-Boher et al. | |
| 5,490,393 A * | 2/1996 | Fuesting | F25B 15/02 62/101 |
| 5,570,584 A * | 11/1996 | Phillips | F25B 15/02 62/101 |
| 5,579,652 A * | 12/1996 | Phillips | F25B 15/02 62/476 |
| 5,666,818 A * | 9/1997 | Manrique-Valadez | F25B 33/00 62/235.1 |
| 5,685,152 A * | 11/1997 | Sterling | B60R 16/03 60/641.15 |
| 5,782,097 A * | 7/1998 | Phillips | F25B 15/02 62/101 |
| 5,934,101 A * | 8/1999 | Takaki | F25B 25/02 62/476 |
| 6,141,987 A * | 11/2000 | Huor | C09K 5/047 62/141 |
| 6,360,730 B1 | 3/2002 | Koethe | |
| 6,460,360 B2 * | 10/2002 | Hsieh | F01K 23/065 165/201 |
| 6,964,168 B1 * | 11/2005 | Pierson | F01K 25/08 60/651 |
| 7,062,913 B2 * | 6/2006 | Christensen | F01K 25/08 60/651 |
| 7,178,358 B2 * | 2/2007 | Inaba | F02G 5/04 62/238.4 |
| 7,454,910 B2 * | 11/2008 | Hamada | F01K 23/065 60/618 |
| 7,827,814 B2 * | 11/2010 | Slater | F24D 11/0221 62/235.1 |
| 8,188,198 B2 * | 5/2012 | Van Der Schrick | C08F 10/00 422/138 |
| 8,297,065 B2 | 10/2012 | Vaisman et al. | |
| 8,484,986 B2 | 7/2013 | Waibel | |
| 8,544,296 B2 * | 10/2013 | Santos | C10L 3/107 62/611 |
| 8,549,877 B2 * | 10/2013 | Santos | C10L 3/107 62/611 |
| 8,555,666 B1 | 10/2013 | Pettus | |
| 8,561,407 B2 * | 10/2013 | Sines | F03G 7/04 60/641.2 |
| 8,800,280 B2 * | 8/2014 | Harif | F01K 25/02 60/515 |
| 8,966,916 B2 | 3/2015 | Deaconu | |
| 9,091,469 B2 * | 7/2015 | Xiang | B01D 1/0041 |
| 9,134,056 B2 * | 9/2015 | Levy | F24F 3/1417 |
| 9,173,415 B2 * | 11/2015 | Meillan | A01J 9/04 |
| 9,243,520 B2 * | 1/2016 | Oxner | F01K 25/08 |
| 2002/0112850 A1 * | 8/2002 | Hsieh | F01K 23/065 165/201 |
| 2003/0000213 A1 * | 1/2003 | Christensen | F01K 25/08 60/670 |
| 2004/0216483 A1 * | 11/2004 | Inaba | F02G 5/04 62/498 |
| 2004/0255586 A1 * | 12/2004 | Hamada | F01K 23/065 60/670 |
| 2005/0144949 A1 * | 7/2005 | Hamada | F01K 23/065 60/670 |
| 2005/0262858 A1 * | 12/2005 | Inaba | B60H 1/00878 62/190 |
| 2008/0072592 A1 * | 3/2008 | Driver | F01C 11/004 60/520 |
| 2009/0226308 A1 | 9/2009 | Vandor | |
| 2010/0218513 A1 | 9/2010 | Vaisman et al. | |
| 2010/0230071 A1 * | 9/2010 | Slater | F24D 11/0221 165/45 |
| 2010/0243228 A1 | 9/2010 | Price | |
| 2010/0258251 A1 * | 10/2010 | Nitschke | F03G 7/005 159/48.1 |
| 2010/0280207 A1 | 11/2010 | Van DerSchrick | C08F 10/00 526/348 |
| 2011/0062724 A1 * | 3/2011 | Sines | F03G 7/04 290/1 R |
| 2011/0204655 A1 | 8/2011 | Waibel | |
| 2012/0079825 A1 * | 4/2012 | Harif | F01K 25/02 60/645 |
| 2012/0167870 A1 | 7/2012 | Lavanga et al. | |
| 2012/0192580 A1 * | 8/2012 | Santos | C10L 3/107 62/172 |
| 2012/0227426 A1 | 9/2012 | Deaconu | |
| 2012/0230657 A1 * | 9/2012 | Uno | B60H 1/00385 392/308 |
| 2012/0279235 A1 * | 11/2012 | Santos | C10L 3/107 62/48.2 |
| 2013/0205778 A1 * | 8/2013 | Hansen | F24J 2/045 60/641.8 |
| 2014/0238021 A1 * | 8/2014 | Harif | F01K 13/00 60/653 |
| 2015/0047378 A1 | 2/2015 | Hollingworth | |
| 2015/0368566 A1 * | 12/2015 | Young | F25J 3/0209 700/273 |
| 2015/0369086 A1 * | 12/2015 | Johnson | F01K 3/262 60/657 |
| 2015/0377179 A1 * | 12/2015 | Nayar | F02G 1/053 60/517 |
| 2016/0031291 A1 * | 2/2016 | Enomoto | B60H 1/00385 62/179 |
| 2016/0033176 A1 * | 2/2016 | Zhou | F25B 17/02 62/109 |

* cited by examiner

HEAT TRANSFER FLUID BASED ZERO-GAS-EMISSION POWER GENERATION

CROSS-REFERENCE TO RELATED APPLICATIONS

The present application claims the benefit under 35 U.S.C. §119(e) of U.S. Provisional Application Ser. No. 61/839,682, filed Jun. 26, 2013. Said U.S. Provisional Application Ser. No. 61/839,682 is hereby incorporated by reference in its entirety.

The present application also claims the benefit under 35 U.S.C. §119(e) of U.S. Provisional Application Ser. No. 61/840,799, filed Jun. 28, 2013. Said U.S. Provisional Application Ser. No. 61/840,799 is hereby incorporated by reference in its entirety.

The present application is related to co-pending and concurrently filed U.S. patent application Ser. No. 14/314,336, and entitled "Single-Well Power Generation Utilizing Ground Energy Source" listing Sheng Heng Xu as inventor, the entirety of which is incorporated herein by reference.

The present application is also related to co-pending and concurrently filed U.S. patent application Ser. No. 14/314,416, and entitled "Ground Energy Harvesting and Accumulating System" listing Sheng Heng Xu as inventor, the entirety of which is incorporated herein by reference.

TECHNICAL FIELD

The disclosure generally relates to the field of energy harvesting systems, and particularly to a method and system for harvesting electric energy for powering devices.

BACKGROUND

Electricity generation is the process of generating electrical power from other sources of primary energy, such as coal, oil and gas. However, using such sources of primary energy to generate electricity cause severe atmospheric pollution.

SUMMARY

The present disclosure is directed to an apparatus. The apparatus includes a heat absorber configured to absorb heat and provide the absorbed heat to a first heat transferring fluid. The apparatus also includes a pump fluidly coupled to the heat absorber, the pump configured to facilitate circulating movement of the first heat transferring fluid. The apparatus further includes an evaporator fluidly coupled to the pump and the heat absorber, the evaporator configured to: receive the first heat transferring fluid; facilitate heat exchange between the first heat transferring fluid and a second heat transferring fluid; and return the first heat transferring fluid to the heat absorber. The apparatus further includes a compressor fluidly coupled to the evaporator, the compressor configured to compress the second heat transferring fluid to increase temperature and pressure of the second heat transferring fluid. The apparatus further includes an electricity generator fluidly coupled to the compressor, the electricity generator configured to generate electricity based on the second heat transferring fluid received from the compressor. The apparatus further includes a heat recovery unit fluidly coupled to the electricity generator, the heat recovery unit configured to retrieve heat and liquefy the second heat transferring fluid. The apparatus further includes an expansion valve fluidly coupled to the heat recovery unit and the evaporator, the expansion valve configured to regulate pressure of the second heat transferring fluid received from the heat recovery unit and return the second heat transferring fluid to the evaporator.

A further embodiment of the present disclosure is directed to a vehicle utilizing the electricity generator.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

There are various zero-emission energies available. For example, solar energy, air energy, ground energy, ocean energy and the like, which are permanent energy sources and can be transformed into power free of pollution. One embodiment of the present disclosure is directed to a system and method that is able to utilize the energy harvested from such sources for power generation.

Figure 1:
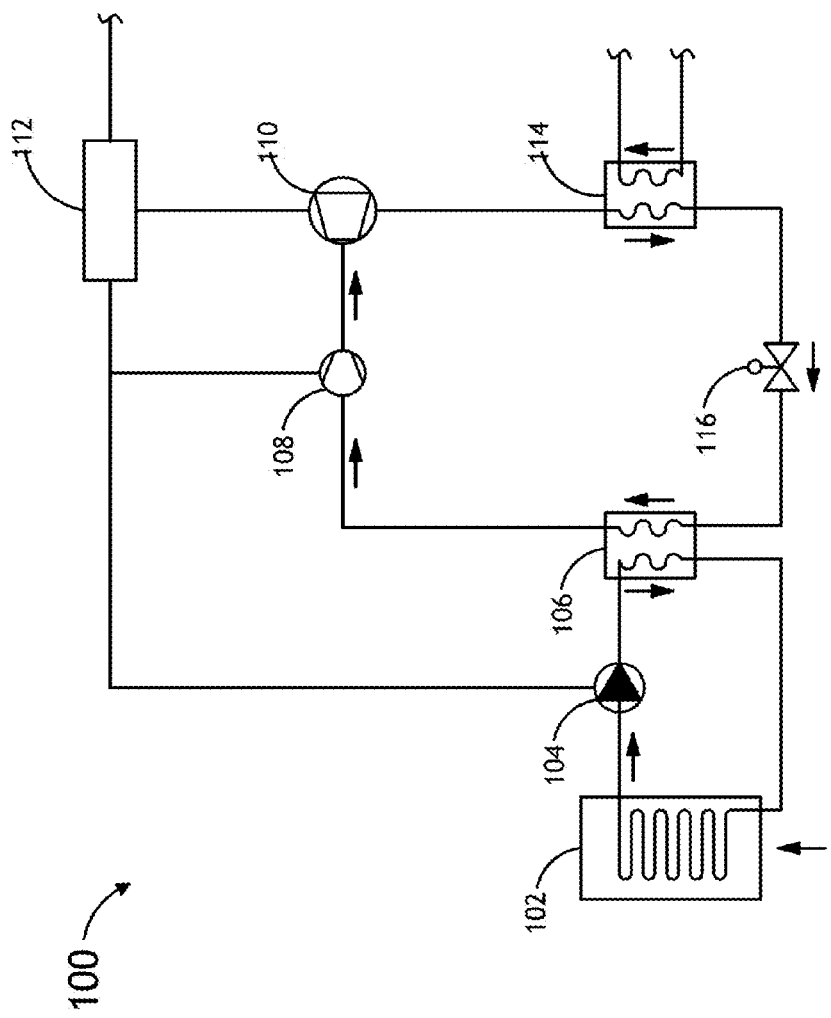
FIG. 1 is a block diagram depicting a heat transfer fluid based zero pollution power generator.

Referring generally to FIG. 1, a system 100 in accordance with the present disclosure is shown. An energy concentrator 102 (may also be referred to as a heat absorber) is utilized to absorb heat from one or more sources such as solar, ground, ocean and the like. A circulating pump 104 is utilized to facilitate circulating movement of heat transferring fluid in the energy concentrator 102. In addition, the circulating pump 104 moves the heat transferring fluid from the energy concentrator 102 to the evaporator 106, and back to the energy concentrator 102, forming a circulating system as shown in FIG. 1.

The evaporator 106 is configured to provide heat exchange in order to produce the required output fluid. More specifically, the evaporator 106 takes the heat provided by the energy concentrator 102 and vaporizes the input fluid to produce a refrigerant vapor having a low temperature and low pressure. This low temperature low pressure refrigerant vapor is then received by the compressor 108, which changes the low temperature low pressure refrigerant vapor into a high temperature high pressure vapor.

This high temperature high pressure vapor is then used to power the generator unit 110. In one embodiment, the high temperature high pressure vapor actuates one or more axels in the generator unit 110 to generate electricity. The electricity may be delivered for consumption and/or stored in a battery 112. A portion of the electricity generated may also be used to power the circulating pump 104 and/or the compressor 108.

After passing through the generator 110, the pressure of the high temperature high pressure vapor is lowered. It then passes through a heat recovery unit 114, which is utilized to retrieve the heat and turns the vapor into a liquid form having a low temperature and low pressure. An expansion valve 116 is then utilized to adjust its pressure and recycles it into the evaporator 106. This cycle can repeat continuously to provide power generation.

It is contemplated that since the energy concentrator 102 is constantly absorbing heat, the energy source for power generation is unlimited. Furthermore, with refrigerant vapor moving in a closed circulation, the system 100 ensures no emission of hazardous substance and thus makes the power generation system pollution free.

It is also contemplated that the system 100 as described above can be adapted to harvest heat from other sources in addition to solar, ground and the like. For instance, movements of a car release energy to counter ground and air friction. Having the abilities to retrieve discharged energy and abate (or eliminate) waste gas emission is highly appreciated. The system 100 may therefore be adapted to retrieve heat released into the air and to extract energy from air and use it to generate power. Utilizing the energy harvested in this manner reduces and/or eliminates burning of gasoline and emission of waste gases.

Figure 2:
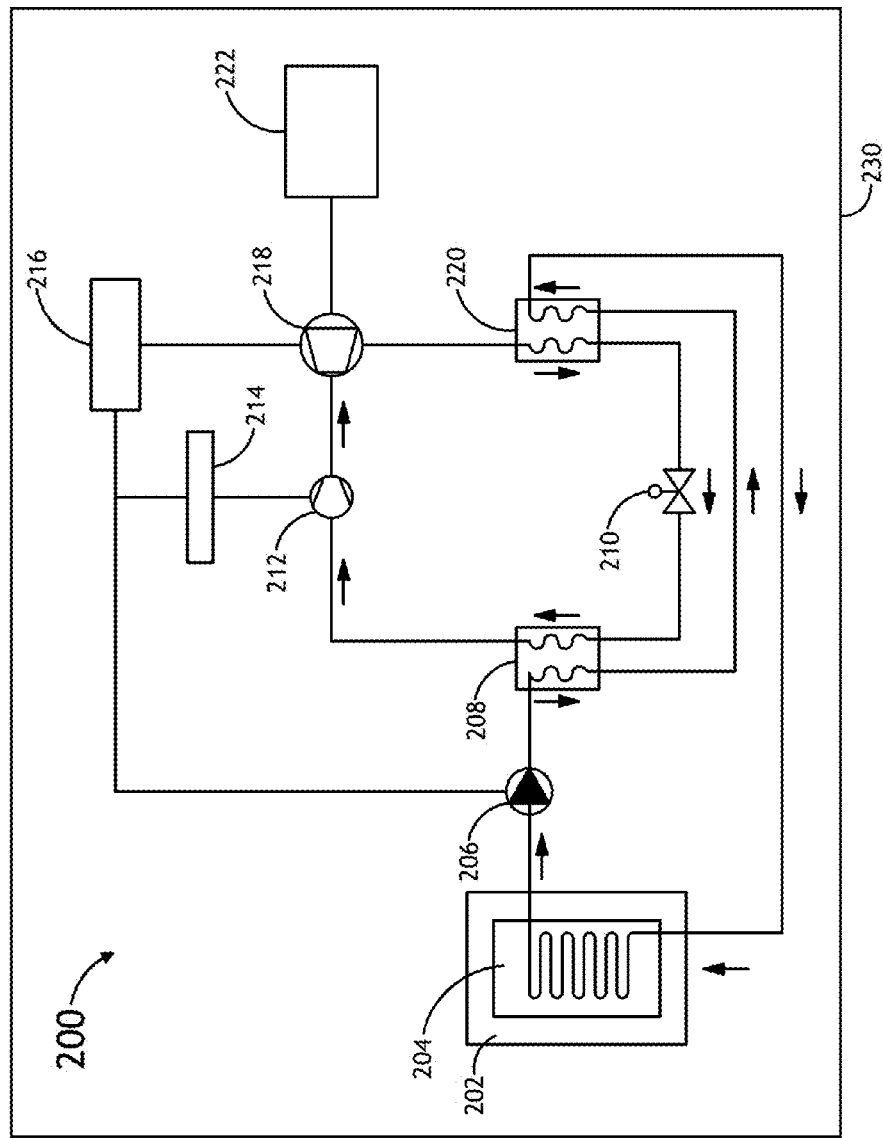
FIG. 2 is a block diagram depicting a heat transfer fluid based zero-gas-emission power system for an automobile.

Referring generally to FIG. 2, a system 200 in accordance with one embodiment the present disclosure is shown. A portion of the body of a car 230 that contacts the air is indicated as element 202. This portion of the car body 202 directly contacts the air when the car 230 is either standstill or moving. It is configured to facilitate heat exchange through the use of a heat transfer fluid based energy concentrator 204.

In one embodiment, the energy concentrator 204 is in direct contact with the car body 202 in order to provide effective absorption of heat from the car body 202. A circulating pump 206 is utilized to facilitate circulating movement of the heat transferring fluid (e.g., antifreeze) in the energy concentrator 204. In addition, the circulating pump 206 moves the heat transferring fluid from the energy concentrator 204 to the evaporator 208, and eventually to the liquefier 220 and back to the energy concentrator 204, forming a circulating system as shown in FIG. 1.

The evaporator 208 is configured to provide heat exchange in order to produce the required output fluid. More specifically, the evaporator 208 takes the heat provided by the energy concentrator 204 and vaporizes the input fluid to produce a refrigerant vapor having a low temperature and low pressure. This low temperature low pressure refrigerant vapor is then received by the compressor 212, which changes the low temperature low pressure refrigerant vapor into a high temperature high pressure vapor.

This high temperature high pressure vapor is then used to drive the power generation unit 218. In one embodiment, the power generation unit 218 includes an engine, and the high temperature high pressure vapor actuates one or more pistons inside the engine, which in turn spins the principle axel. The spinning axel is utilized to generate electricity, recharge the battery 216 and provide power to the powertrain 222. In one embodiment, the compressor 212 is controlled by a frequency modulator 214, which controls the compressor 212 based on the frequency of the power generated so as to regulate the rotational speed of the compressor 212.

After passing through the one or more pistons, the pressure of the high temperature high pressure vapor is lowered. It then passes through a liquefier 220, which is utilized to retrieve the heat and turns the vapor into a liquid form having a low temperature and low pressure. An expansion valve 210 is then utilized to adjust its pressure and recycles it into the evaporator 208 to extract heat from the energy concentrator 204. As described above, the evaporator 208 vaporizes the input fluid to produce a refrigerant vapor having a low temperature and low pressure. This refrigerant vapor is converted to high temperature high pressure vapor by the compressor 212 to actuate the piston(s). This cycle can repeat continuously to provide power for driving the car.

It is noted that while the antifreeze fluid and the refrigerant (coolant) fluid circulate in the system 200 via different paths, heat exchange between them is facilitated utilizing the system 200 as described above. More specifically, when the circulating pump 206 is working, the antifreeze fluid circulates between the evaporator 208, the liquefier 220 and the energy concentrator 204. Heat exchange between the antifreeze fluid and the refrigerant fluid is constantly provided at the evaporator 208 and the liquefier 220.

In one embodiment, the compressor is utilized to compress the received refrigerant vapor to increase its temperature and pressure. The increased temperature may range between approximately 40° C. and 50° C. The increased pressure may range between approximately 15 kg/cm$^2$ and 20 kg/cm$^2$. Once its energy is released, the temperature and the pressure of this vapor are decreased. The decreased temperature may range between approximately 5° C. and 15° C. The decreased pressure may range between approximately 2 kg/cm$^2$ and 5 kg/cm$^2$. This refrigerant fluid is then circulated again as described above.

It is contemplated that suitable refrigerant fluid may include the refrigerant fluid typically used by the air-conditioning unit readily available on the vehicle, and suitable antifreeze fluid may include the antifreeze fluid typically used by the vehicle as well. It is understood, however, that the ranges provided above are exemplary. Different types of heat transferring fluids may be utilized without departing from the spirit and scope of the present disclosure.

It is contemplated that since the car body 202 is constantly absorbing heat or producing heat (e.g., air friction), the energy source is unlimited. Therefore, the energy concentrator 204 has an unlimited energy supply to harvest. With refrigerant vapor moving in a closed circulation, the system 200 ensures no emission of hazardous substance and thus makes the car a zero-gas-emission automobile.

It is understood that the present disclosure is not limited to any underlying implementing technology. The present disclosure may be implemented using a variety of technologies without departing from the scope and spirit of the disclosure or without sacrificing all of its material advantages.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. An apparatus, comprising:
   a heat absorber configured to absorb heat and provide the absorbed heat to a first heat transferring fluid;
   a pump fluidly coupled to the heat absorber, the pump configured to facilitate circulating movement of the first heat transferring fluid;
   an evaporator fluidly coupled to the pump and the heat absorber, the evaporator configured to:
   receive the first heat transferring fluid;
   facilitate heat exchange between the first heat transferring fluid and a second heat transferring fluid; and
   return the first heat transferring fluid to the heat absorber;

a compressor fluidly coupled to the evaporator, the compressor configured to compress the second heat transferring fluid to increase temperature and pressure of the second heat transferring fluid;
an electricity generator fluidly coupled to the compressor, the electricity generator configured to generate electricity based on the second heat transferring fluid received from the compressor;
a heat recovery unit fluidly coupled to the electricity generator, the heat recovery unit configured to retrieve heat and liquefy the second heat transferring fluid; and
an expansion valve fluidly coupled to the heat recovery unit and the evaporator, the expansion valve configured to regulate pressure of the second heat transferring fluid received from the heat recovery unit and return the second heat transferring fluid to the evaporator.

2. The apparatus of claim 1, wherein the heat exchange between the first heat transferring fluid and the second heat transferring fluid in the evaporator vaporizes the second heat transferring fluid.

3. The apparatus of claim 1, wherein at least a portion of the electricity generated by the electricity generator is stored in a battery.

4. The apparatus of claim 1, wherein at least a portion of the electricity generated by the electricity generator is provided to power the compressor.

5. The apparatus of claim 1, wherein at least a portion of the electricity generated by the electricity generator is provided to power the pump.

6. The apparatus of claim 1, wherein the apparatus is utilized to power a vehicle.

7. The apparatus of claim 6, wherein at least a portion of the electricity generated by the electricity generator is provided to a powertrain.

8. The apparatus of claim 6, further comprising:
a frequency modulator configured to regulate a rotational speed of the compressor based on a frequency of power generated by the electricity generator.

9. An apparatus, comprising:
a heat absorber configured to absorb heat and provide the absorbed heat to a first heat transferring fluid;
a pump fluidly coupled to the heat absorber, the pump configured to facilitate circulating movement of the first heat transferring fluid;
an evaporator fluidly coupled to the pump and the heat absorber, the evaporator configured to:
receive the first heat transferring fluid;
facilitate heat exchange between the first heat transferring fluid and a second heat transferring fluid, wherein the heat exchange between the first heat transferring fluid and the second heat transferring fluid in the evaporator vaporizes the second heat transferring fluid; and
return the first heat transferring fluid to the heat absorber;
a compressor fluidly coupled to the evaporator, the compressor configured to compress the vaporized second heat transferring fluid to increase temperature and pressure of the vaporized second heat transferring fluid;
an electricity generator fluidly coupled to the compressor, the electricity generator configured to generate electricity based on the vaporized second heat transferring fluid received from the compressor, wherein at least a portion of the electricity generated by the electricity generator is provided to power the compressor and at least a portion of the electricity generated by the electricity generator is provided to power the pump;
a heat recovery unit fluidly coupled to the electricity generator, the heat recovery unit configured to retrieve heat and liquefy the second heat transferring fluid; and
an expansion valve fluidly coupled to the heat recovery unit and the evaporator, the expansion valve configured to regulate pressure of the second heat transferring fluid received from the heat recovery unit and return the second heat transferring fluid to the evaporator.

10. The apparatus of claim 9, wherein at least a portion of the electricity generated by the electricity generator is stored in a battery.

11. The apparatus of claim 9, wherein the apparatus is utilized to power a vehicle.

12. The apparatus of claim 11, wherein at least a portion of the electricity generated by the electricity generator is provided to a powertrain.

13. The apparatus of claim 11, further comprising:
a frequency modulator configured to regulate a rotational speed of the compressor based on a frequency of power generated by the electricity generator.

14. The apparatus of claim 11, wherein the heat absorber is configured to absorb heat available on the vehicle.

15. A vehicle, comprising:
a heat absorber configured to absorb heat available on the vehicle and provide the absorbed heat to a first heat transferring fluid;
a pump fluidly coupled to the heat absorber, the pump configured to facilitate circulating movement of the first heat transferring fluid;
an evaporator fluidly coupled to the pump and the heat absorber, the evaporator configured to:
receive the first heat transferring fluid;
facilitate heat exchange between the first heat transferring fluid and a second heat transferring fluid; and
return the first heat transferring fluid to the heat absorber;
a compressor fluidly coupled to the evaporator, the compressor configured to compress the second heat transferring fluid to increase temperature and pressure of the second heat transferring fluid;
an electricity generator fluidly coupled to the compressor, the electricity generator configured to generate electricity based on the second heat transferring fluid received from the compressor;
a heat recovery unit fluidly coupled to the electricity generator, the heat recovery unit configured to retrieve heat and liquefy the second heat transferring fluid;
an expansion valve fluidly coupled to the heat recovery unit and the evaporator, the expansion valve configured to regulate pressure of the second heat transferring fluid received from the heat recovery unit and return the second heat transferring fluid to the evaporator; and
a powertrain, wherein at least a portion of the electricity generated by the electricity generator is provided to the powertrain.

16. The vehicle of claim 15, wherein the heat exchange between the first heat transferring fluid and the second heat transferring fluid in the evaporator vaporizes the second heat transferring fluid.

17. The vehicle of claim 15, wherein at least a portion of the electricity generated by the electricity generator is stored in a battery.

18. The vehicle of claim 15, wherein at least a portion of the electricity generated by the electricity generator is provided to power the compressor.

19. The vehicle of claim 15, wherein at least a portion of the electricity generated by the electricity generator is provided to power the pump.

20. The vehicle of claim 15, further comprising:
a frequency modulator configured to regulate a rotational speed of the compressor based on a frequency of power generated by the electricity generator.

* * * * *